J. GONSIOR, W. FRANK & C. SCHNEIDER.
COMBINED MAIL BOX AND MILK BOTTLE HOLDER.
APPLICATION FILED MAY 27, 1916.

1,204,268.

Patented Nov. 7, 1916.

Inventors
J. Gonsior
W. Frank
C. Schneider

By A. M. Wilson

Attorney

UNITED STATES PATENT OFFICE.

JOZEPH GONSIOR, WILLIAM FRANK, AND CHRISTIAN SCHNEIDER, OF MEDINA, NORTH DAKOTA.

COMBINED MAIL-BOX AND MILK-BOTTLE HOLDER.

1,204,268. Specification of Letters Patent. Patented Nov. 7, 1916.

Application filed May 27, 1916. Serial No. 100,302.

*To all whom it may concern:*

Be it known that we, JOZEPH GONSIOR, a subject of the Emperor of Austria-Hungary, and WILLIAM FRANK and CHRISTIAN SCHNEIDER, citizens of the United States, residing at Medina, in the county of Stutsman and State of North Dakota, have invented certain new and useful Improvements in Combined Mail-Boxes and Milk-Bottle Holders, of which the following is a specification.

This invention relates to new and useful improvements in combined mail box and milk bottle holders.

The primary object of the invention is to provide a simple device adapted for the reception of milk bottles by the vendor thereof, the device being so arranged that an unauthorized person will be unable to remove the bottles therefrom, thus preventing the loss of the vended milk by the consumer.

A further object of the device is to provide a dispenser for milk that is easy and inexpensive to manufacture but which is adapted for preventing the theft of the bottles of milk when placed in the device by the vendor, the consumer however having ready access thereto for removing the milk when desired.

A still further object of the device is to provide a receiving member for both mail and receptacles for protecting the same from the elements as well as from tampering by thieves.

With these general objects in view and others that will appear as the nature of the invention is better understood, the same consists in the novel combination and arrangement of parts hereinafter fully described, illustrated in the accompanying drawings and then claimed.

Figure 1:
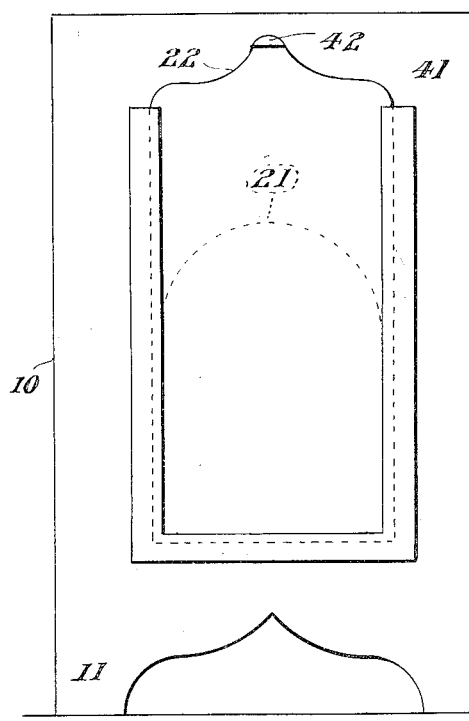
Figure 2:
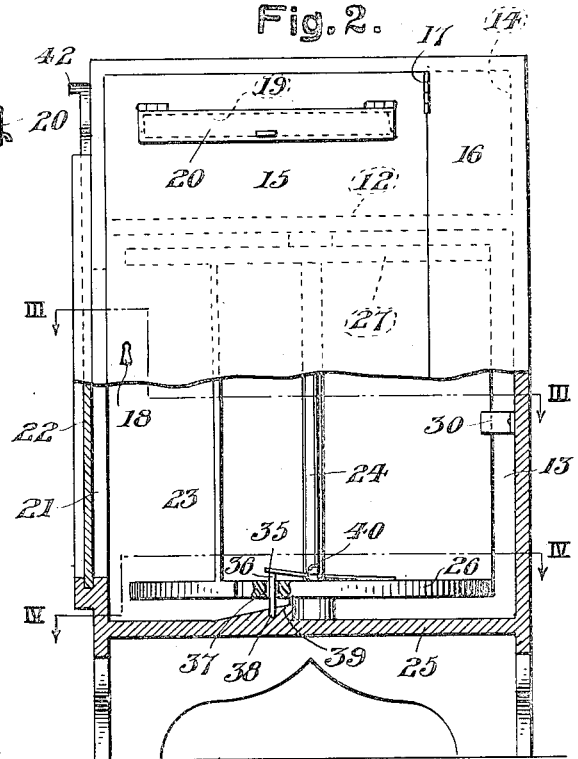
Figure 4:
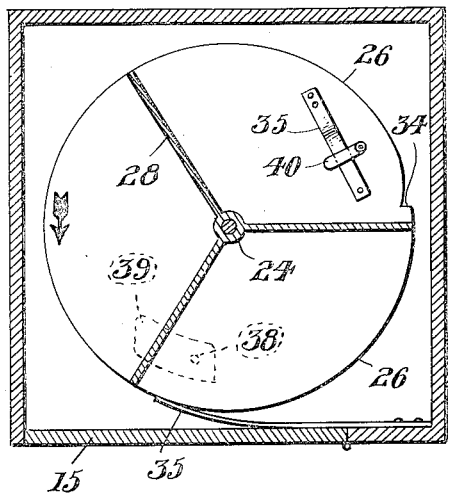
Figure 3:
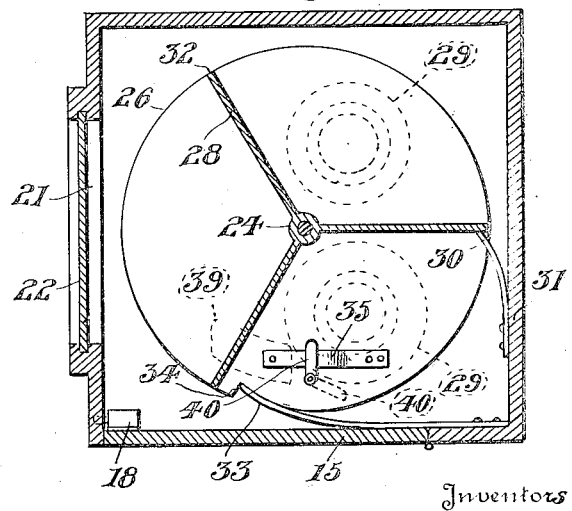
Figure 5:
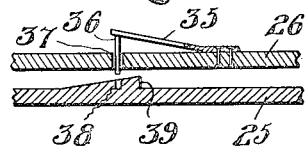

In the drawings forming a part of this application and in which like designating characters refer to corresponding parts throughout the several views, Figure 1 is a front elevation of the device. Fig. 2 is a side elevation thereof, partly in section. Figs. 3 and 4 are transverse sectional views taken upon lines III—III and IV—IV respectively of Fig. 2, and Fig. 5 is an enlarged detail sectional view of the spring latch employed with the bottle support.

The invention contemplates an upright casing 10 rectangular in cross section and mounted upon corner legs 11, the interior thereof being divided by means of a horizontal partition 12 into a lower receptacle receiving chamber 13 and an upper mail receiving chamber 14.

A swinging door 15 is arranged upon the receptacle side 16 being hinged thereto as at 17 and provided with a desirable form of lock 18. The said door 15 is serviceable in closing both of the chambers 13 and 14 and is provided with a mail entrance slot 19 in its upper portion communicating with the chamber 14, the said slot being normally closed by a hinged lid 20.

The casing 10 is provided with an entrance opening 21 for the reception of milk bottles in the forward wall thereof and arranged with a vertically movable closing slide 22. A milk bottle support 23 in the form of a drum having a central shaft 24 is vertically journaled centrally within the bottle chamber 13 between the bottom 25 thereof and the aforementioned partition 12. Oppositely positioned disks 26 and 27 are carried by the shaft 24 adjacent the lower and upper ends thereof respectively, while radial plates or walls 28 connect the said disks 26 and 27 together extending outwardly from the said shaft 24 thereby furnishing three equal sized compartments for the reception of milk bottles as indicated at 29 in Fig. 3 by dotted lines.

A spring stop 30 is carried by the rear wall 31 of the casing 10 projecting inwardly within the path of movement of the outer edges 32 of the plates 28 so arranged as to permit the drum 23 to revolve only in the direction indicated by the arrow in Fig. 4. A similar spring stop 33 is carried by the casing side 16 projecting inwardly in the plane of the lower disk 26 and adapted for springing into engagement with a peripheral notch 34 of the said disk 26 when the drum 23 is positioned for the removal of one of the bottles 29 upon opening the door 15.

A spring latch 35 is carried by the disk 26 having a bolt 36 positioned through a vertical opening 37 in the said disk 26 adapted to be positioned in vertical alinement with a keeper socket 38 provided in an inclined lug 39 of the adjacent inner face of the casing bottom 25. The latch 35 by means of its resiliency is normally elevated with the bolt 36 retracted as best illustrated in Fig. 5 of the drawings, but a swinging detent 40 is carried by the disk 26 adapted to swing over the latch 35 for retaining the latch depressed with the bolt 36 in the plane of the lug 39 and whereby during the revolution of the drum 23 in the direction indicated by the arrow in Fig. 4, the bolt 36 will ride up the lug 39 and drop within the recess 38 retaining the drum 23 against further rotation in either direction until the detent 40 is released.

From this detailed description of the invention, the complete operation thereof will be understood. With the drum 23 positioned as illustrated in Fig. 4 with one of the compartments thereof arranged directly inwardly of the door 21 in the front casing side or wall 41, the sliding door 22 may be elevated by means of the finger-hold 42 and a milk bottle such as 29 positioned therein by the vendor. The vendor will then revolve the drum 23 in the direction of the arrow indicated in Fig. 4 placing a second milk bottle in the next recurring pocket of the drum 23 if desired and further revolving the drum until the stop 33 engages the notch 34 preventing a further rotation thereof while the stop 30 will simultaneously engage one of the plate edge portions 32 and the drum 23 will be held stationary. Simultaneously therewith, the bolt 36 will be received within the keeper recess 38, thus further locking the drum 23 against any revolutions tending to position the drum so that the bottles 29 might be removed through the front door 21. The vendee or owner of the device may then unlock and open the door 15 whereupon one of the bottles 29 being positioned directly inwardly thereof may be readily removed. The detent 40 will then be released as well as the stop 30 allowing a reverse turning of the drum 23 for readily removing the other bottle 29 from the device. When the drum has been turned in a reverse direction sufficiently to remove the bolt 36 from alining with the socket 38, the detent 40 may be repositioned over the latch 35 while the stop 30 will be held back until the drum 23 is again reset or positioned operatively as illustrated in Fig. 4 of the drawings and whereupon the door 15 may be closed and securely locked as before.

It will be understood that the mail slot 19 is positioned considerably above the partition 12 forming the bottom of the mail chamber 14, which taken together with the relatively small slot 19 prevents any removal of the mail until the door 15 is opened.

An advantageous structure is thus arranged adapted for the reception both of mail matter and vendable commodities preventing the theft of the same while the articles are readily removable by the owner upon releasing the device.

What I claim as new is:—

1. A receiving device comprising a casing having an entrance and an exit door, a supporting drum within the said casing comprising a vertical shaft centrally journaled therein, upper and lower disks carried by the said shaft, radially arranged partition plates between the said disks and attached to the said shaft, a lug having an inclined face provided with a recess carried by the bottom of the casing beneath the lower disk of the drum, a normally elevated latch carried by said lower disk, a bolt upon the said latch having a path of movement in the plane of said lug and recess during the operation of the drum, and a releasable detent for the said latch and bolt carried by the said lower disk.

2. A receiving device comprising a casing having an entrance and an exit door, a supporting drum within the said casing comprising a vertical shaft centrally journaled therein, upper and lower disks carried by the said shaft, radially arranged partition plates between the said disks and attached to the said shaft, a lug having an inclined face provided with a recess carried by the bottom of the casing beneath the lower disk of the drum, a normally elevated latch carried by said lower disk, a bolt upon the said latch having a path of movement in the plane of said lug and recess during the operation of the drum, a releasable detent for the said latch and bolt carried by the said lower disk, the said lower disk having a peripheral notch, a spring stop in resilient engagement with the periphery of the said lower disk and secured to the side of the casing and an inwardly extending stop carried by the rear of the casing within the path of movement of the edge portions of the said plates.

In testimony whereof we affix our signatures.

JOZEPH GONSIOR.
WILLIAM FRANK.
CHRISTIAN SCHNEIDER.